United States Patent [19]

Coleman

[11] 4,124,866
[45] Nov. 7, 1978

[54] VIDEO DISC INSERTION/EXTRACTION SYSTEM FOR A VIDEO DISC PLAYER

[75] Inventor: Clyde F. Coleman, Crawfordsville, Ind.

[73] Assignee: RCA Corporation, New York, N.Y.

[21] Appl. No.: 747,729

[22] Filed: Dec. 6, 1976

[51] Int. Cl.² ............................................ G11B 17/04
[52] U.S. Cl. .................................. 358/128; 360/133; 360/97; 274/9 B
[58] Field of Search ................. 358/128; 179/100.3 V, 179/100.1 B, 100.4 R; 360/133, 97, 132, 99, 86; 274/9 B, 42 R

[56] References Cited

U.S. PATENT DOCUMENTS

| 3,593,327 | 7/1971 | Shill | 360/97 |
| 3,899,181 | 8/1975 | Dannert | 360/133 |
| 4,063,286 | 12/1977 | Takahara | 358/128 |

*Primary Examiner*—Bernard Konick
*Assistant Examiner*—Alan Faber
*Attorney, Agent, or Firm*—Eugene M. Whitacre; Joseph S. Tripoli; Dilip A. Kulkarni

[57] ABSTRACT

A system for inserting and removing a video disc into and from a player without the need for removing the video disc from its protective cover during said insertion and removal is disclosed. The system includes a clamping device built into the player for protruding into a protective cover during its insertion into the player. The clamping device precludes a removal of the enclosed video disc from the player during the subsequent cover withdrawal. The video disc is transferred to the player turntable when the lid of the player is closed. After playback, the lid is opened and an empty cover is inserted into the player. During the insertion of the empty cover, the video disc is automatically returned to the cover. The withdrawal of the cover after its full insertion into the player, removes the enclosed video disc.

8 Claims, 13 Drawing Figures

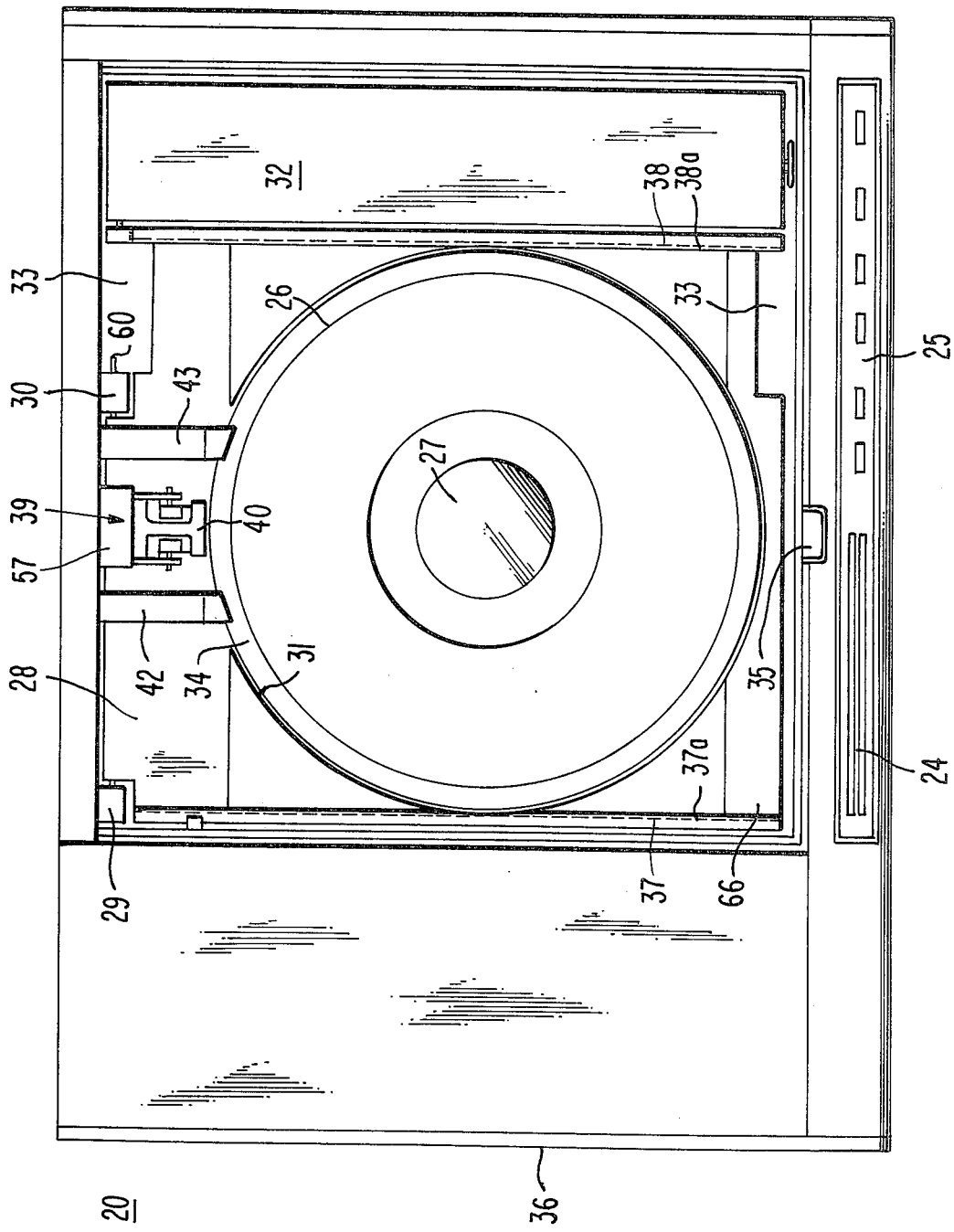

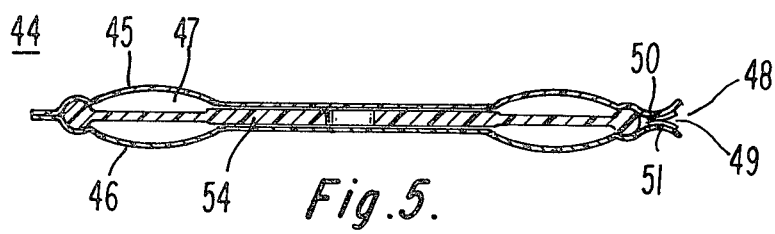
Fig.5.
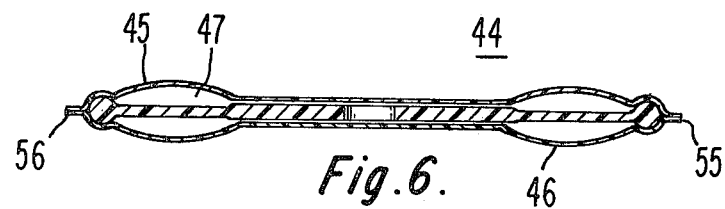
Fig.6.
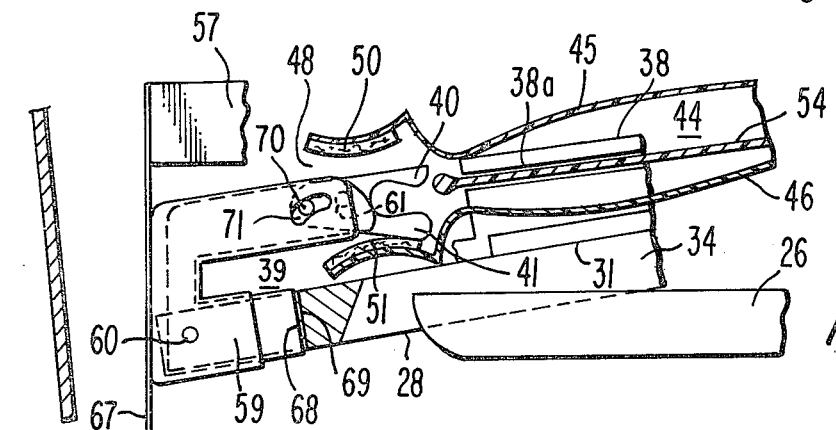
Fig.7.
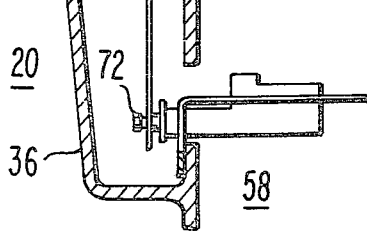
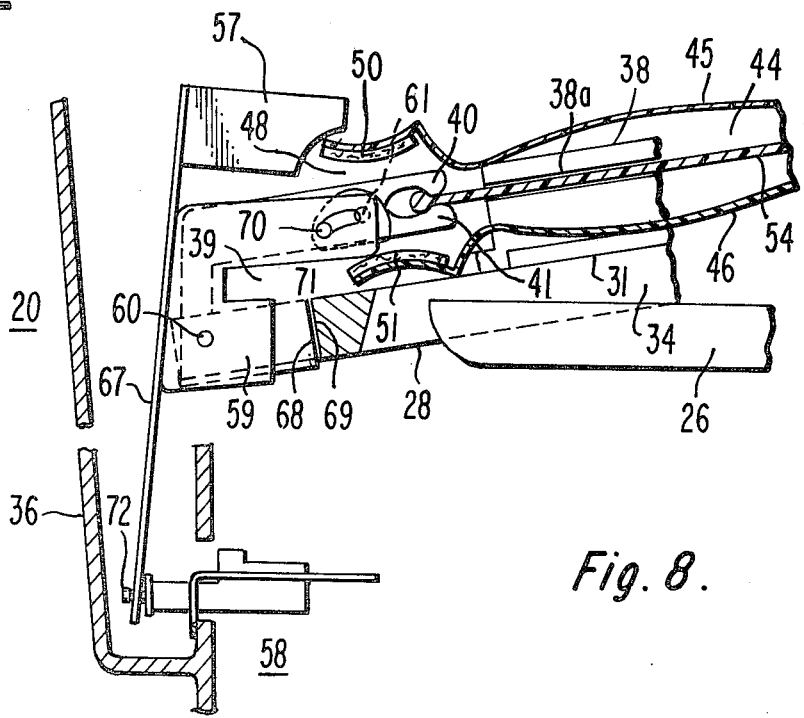
Fig.8.

VIDEO DISC INSERTION/EXTRACTION SYSTEM FOR A VIDEO DISC PLAYER

The invention relates to a video disc system, and, more particularly, to an apparatus for inserting and removing a video disc into and from a playback device while remaining enclosed in its protective cover.

In U.S. Pat. No. 3,842,194, issued to Jon K. Clemens, a video disc system is disclosed. In an arrangement therein disclosed, an information track comprises of geometric variations in the bottom of a smooth spiral groove on the surface of a disc record. The disc record has a deposit of dielectric material overlying a coating of conductive material. During playback, variations in the capacitance formed between an electrode incorporated in a groove-riding stylus and the conductive coating of the disc record are sensed as it is rotated by a supporting turntable to reconstruct the recorded information.

In the systems of the Clemens type, in order to obtain adequate playing time, the successive groove convolutions are relatively closely spaced on the surface of the video disc (e.g., 4.5 micrometers corresponding to a groove density of 5,555 gpi) and the signal elements in the groove bottom are relatively small (e.g., signal element length 0.3 to 0.8 micrometers and signal element depth of 0.10 to 0.15 micrometers).

The accumulation of dust on such video discs presents a considerable problem. The problem of dust accumulation is especially serious when the exposure of a video disc to atmospheric dust is accompanied by the conditions of high temperature and high humidity. It is therefore advantageous to provide a cover which completely encloses a video disc in a dust-proof environment during its storage and handling.

The video discs of the type described above are prone to damage during their manual handling (e.g., scratches, fingerprints, etc). It is therefore desirable to provide a protective cover which permits insertion and withdrawal of an enclosed video disc into and from a playback device without the need for the direct handling of the video disc by the user.

Pursuant to the present invention, a player includes a housing having an input slot dimensioned to permit insertion of a record protective cover into the player. Guide means are mounted in the housing for motion between an elevated position and a depressed position. The guide means are aligned with the input slot when it is occupying the elevated position. Clamping means built into the player protrudes into a cover during its arrival at a fully inserted position in the player. The clamping means is subject to operation in a first condition and a second condition.

When the clamping means is disposed in the first condition, it permits arrival of an occupied cover at a fully inserted position in the player.

Means, responsive to engagement with a protective cover during its arrival at the fully inserted position in the player, are mounted in the housing for alternating the condition of the clamping means between the first condition and the second condition.

The clamping means, while disposed in the second condition, precludes a removal from the player of a disc record, during a cover withdrawal from the fully inserted position after such an occupied cover arrival, permitting the disc record to rest on the guide means upon a conclusion of such a withdrawal.

The player includes means for causing the motion of the guide means from the elevated position to the depressed position to effect a transfer of the disc record from the guide means to the player turntable.

In accordance with another feature of the invention, the guide means motion causing means is responsive to motion of the player lid between the open position and the shut position.

In accordance to a further feature of the invention, the clamping means is subject to operation in a third condition in addition to its operations in the first and the second conditions. The player includes means, responsive to motion of the player lid from the open position to the shut position, for changing the condition of the clamping means to the third condition. A disc record resting on the guide means is transferred to the turntable during motion of the guide means from the elevated position to the depressed position, when accompanied by a change in the condition of the clamping means from the second condition to the third condition.

The condition changing means, in response to motion of the player lid from the shut position to the open position, serves to return the clamping means to the condition it occupied prior to the last change thereof to the third condition.

In the drawings:

FIG. 3 depicts a plan view of the video disc player of FIG. 1 with its lid removed to expose the underlying details;

Figure 1:
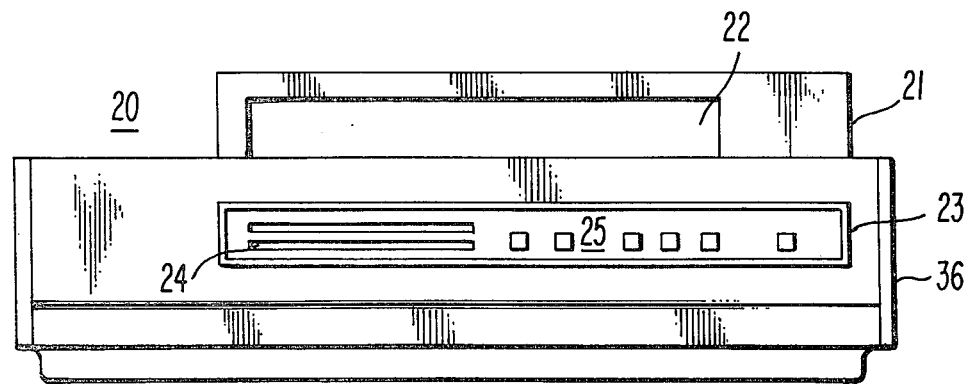
FIG. 1 illustrates a front view of a video disc player incorporating the present invention.
Figure 4:
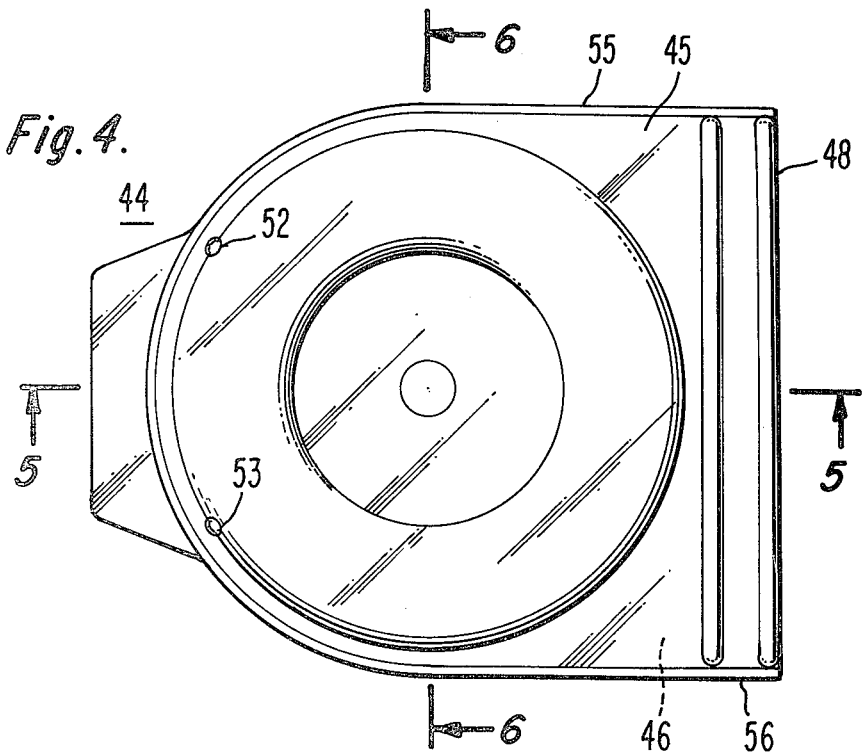
FIG. 4 shows a video disc protective cover suitable for use with the video disc player of FIG. 1.
Figure 11:
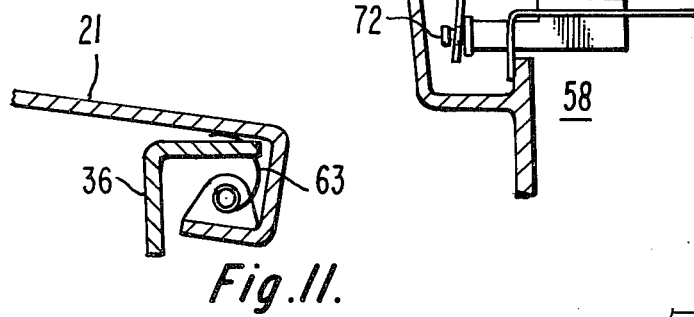
Figure 12:
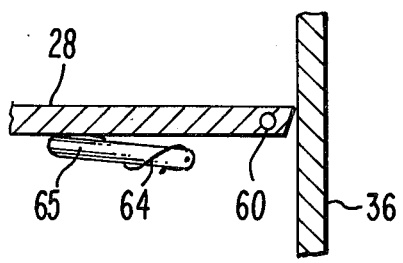
Figure 13:
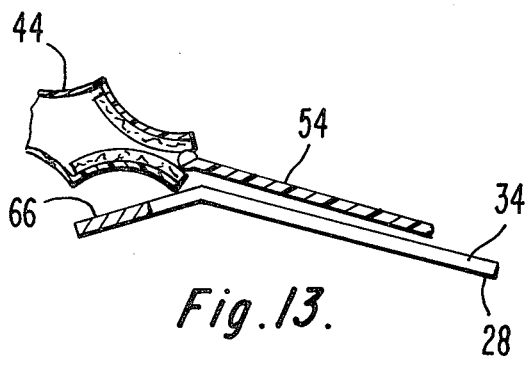

FIGS. 5 and 6 are cross sections of the protective cover of FIG. 4 along the lines 5—5 and 6—6 respectively in FIG. 4;

FIGS. 7 through 10 illustrate a sequence of operations involved in inserting and removing a video disc enclosed in its protective cover into and from the video disc player of FIG. 1 without the need for direct handling of the enclosed video disc;

FIG. 11 shows means for urging the lid of the video disc player of FIG. 1 to open;

FIG. 12 illustrates means for biasing the guide means to an elevated position in the video disc player of FIG. 1; and FIG. 13 shows how the video disc is caused to return to its protective cover upon its insertion into the video disc player of FIG. 1.

FIG. 1 illustrates a video disc player 20 having a lid 21 which is shown disposed in the open position. The lid 21 has an opening 22 defining an input slot when the lid is open. The input slot is dimensioned to permit insertion of a record protective cover into the player and its removal therefrom. As can be seen from FIG. 1, the player includes a control panel 23 comprising a playing time indicator 24 and a set of push buttons 25.

Figure 2:
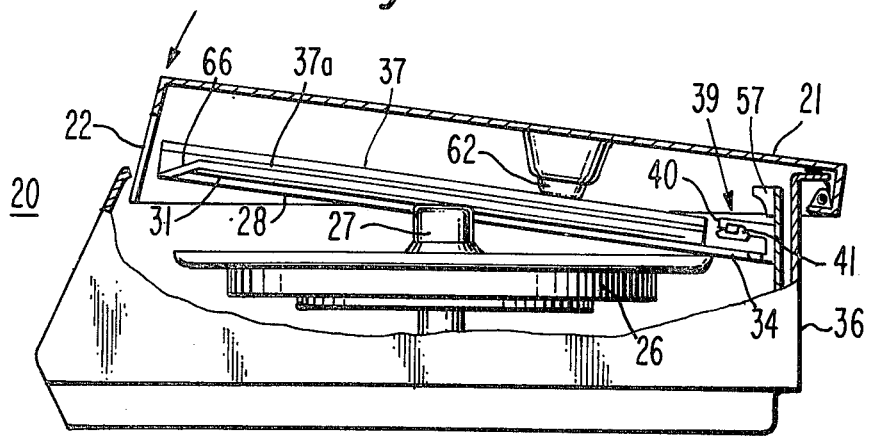
FIG. 2 shows a side view, partly in section, of the video disc player of FIG. 1.

Shown in FIGS. 2 and 3, is a turntable 26 for rotatably supporting a video disc thereon for playback. The turntable 26 has a centering spindle 27 subject to reception in a centering aperture of a video disc upon its placement on the turntable.

A platform 28 is pivotally mounted in the player by hinges 29 and 30 (FIG. 3) for motion between en elevated position, as shown in FIG. 2, and a depressed position, as shown in FIG. 3. The platform 28 has surfaces 31 for properly locating a video disc while it is disposed in the elevated position.

As shown in FIG. 3, the player includes a stylus arm carriage 32 which is translated over a video disc resting on the turntable 26 during playback. The platform 28 has cutouts 33 and 33a to permit the carriage 32 to traverse over the turntable supported video disc without hindrance. The platform 28 has a central opening 34 for permitting the turntable 26 to protrude therethrough when it occupies the depressed position. A push button 35 is mounted on the housing 36 of the player to release the lid 21 to open.

The player includes a pair of tracks 37 and 38 having channels 37a and 38a to guide a record protective cover, during its insertion through the input slot 22, to a fully inserted position in the player. The track 37 is fixedly secured to the platform 28. However, the track 38 is hingedly mounted to the carriage 32 to traverse therewith. If the track 38 were fixedly mounted to the platform instead, it would have interfered with the traversal of the carriage 32 over the turntable supported video disc during playback.

The clamping device 39, including a pair of elements 40 and 41, is mounted at the rear end of the player. As shown in FIG. 3, a pair of wedge-shaped spreaders 42 and 43 are mounted to the player housing 36 to spread open a protective cover during its arrival at the fully inserted position in the player in order to facilitate a protrusion of the clamping elements 40 and 41 into the cover.

FIGS. 4, 5 and 6 show a video disc protective cover 44 suitable for use with the video disc player of FIGS. 1-3. The cover 44 comprises a pair of juxtaposed panels 45 and 46 defining a cavity 47 for enclosing a video disc 54 and an opening 48 in communication with the cavity for permitting the insertion and removal of the video disc into and from the cover. The panels 45 and 46 have portions forming a constricted passage 49 interposed between the cavity 47 and the opening 48. A pair of wiping pads 50 and 51 are secured to the constricted passage forming portions of the panels 45 and 46 for effecting a cleaning of a video disc during its insertion into and removal from the cover. The cover 44 has a pair of detents 52 and 53 for engagement with the bead portion of an enclosed video disc to prevent its accidental removal from its cover.

The wiping pads 50 and 51 may be made from any suitable soft, lintless material—for example, velvet, nonwoven polyester (made by Dupont), polyurethane foam (made by Scott Paper Co., Foam Division), etc.

FIGS. 7-10 illustrate a sequence of operations involved in effecting an insertion of a video disc into the player and its removal therefrom while contained in its protective cover.

Figure 9:
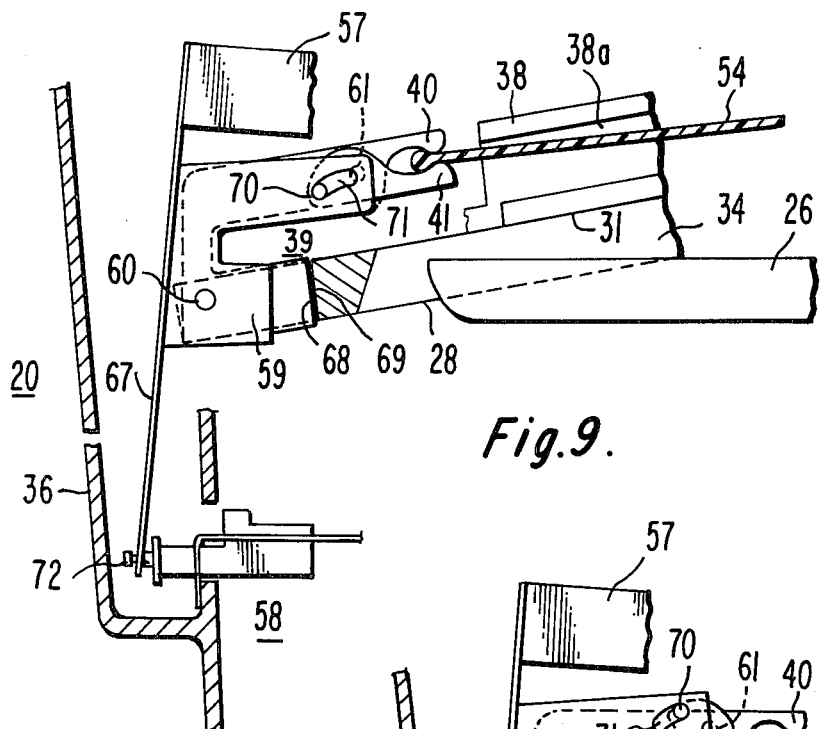
Figure 10:
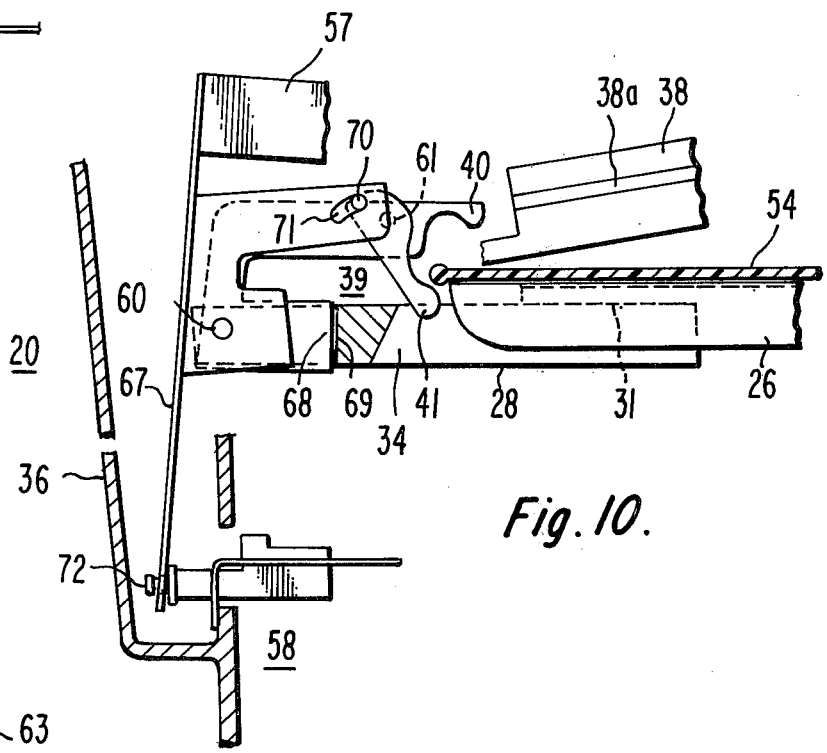

As indicated previously, the clamping device 39 includes a pair of clamping elements 40 and 41. The condition of the clamping means is subject to change between a partly open condition (FIG. 7), a closed condition (FIGS. 8 and 9) and a fully open condition (FIG. 10).

When the lid 21 is opened, the channels 37a and 38a are aligned with the input slot 22 to facilitate insertion of the protective cover 44 into the player and its removal therefrom (FIG. 2). The platform 28 has a flared portion 66 in the vicinity of the input slot 22 (FIG. 2) to lead the ledge portions 55 and 56 of the package (FIG. 6) into the channels 37a and 38a.

FIG. 7 shows a protective cover 44 containing the video disc 54 while it is partially inserted into the player. The wedge-shaped spreaders 42 and 43 (FIG. 3) spread the front portions of the panels 45 and 46 apart to facilitate a protrusion of the clamping elements 40 and 41 into the cover 44 as shown in FIG. 7. When the clamping means 39 are in the partly open condition (FIG. 7), the clamping elements 40 and 41 permit a peripheral portion of the video disc 54 to be admitted therebetween during the arrival of the cover 44 to a fully inserted position in the player.

When the protective cover 44 is fully inserted into the player, the front edge of the panel 45 bears against a block 57 which causes a push-on/push-off switch 58 to change its condition from a retracted condition (FIG. 7) to an extended condition (FIG. 8) by means of a connecting member 67 pivoted about a pin 60. The change in the condition of the push-on/push-off switch 58 from the retracted condition to the extended condition causes an actuated member 59 to rotate about the pin 60 in a clockwise direction from the position in FIG. 7 to the position in FIG. 8 also by means of the connecting member 67. Such rotation of the actuated member 59 causes the clamping element 41 to rotate in an anti-clockwise direction from the position in FIG. 7 to the position in FIG. 8 about a pin 61 secured to the clamping element 40. Such rotation of the clamping element 41 changes the condition of the clamping device 39 from the partly open condition (FIG. 7) to the closed condition (FIG. 8). The elements 40 and 41, while the clamping means 39 is disposed in the closed condition, preclude a removal from the player of the video disc 54 held between the clamping elements 40 and 41, during a cover withdrawal from the fully inserted position after an occupied cover arrival at the fully inserted position in the player, permitting the video disc to remain in the player resting on the locating surfaces 31 of the platform 28 upon a conclusion of such a withdrawal (FIG. 9).

The push-on/push-off switch 58 may be, for example, of the type manufactured by Potter and Brumfield, Model No. A9T4162-6, of Princeton, Indiana.

When the lid 21 is closed, a block 62 secured to the lid (FIG. 2) engages the platform 28 to cause it to rotate from the elevated position (FIGS. 1 and 7-9) to the depressed position (FIGS. 2 and 10). The rotation of the platform 28 from the elevated position to the depressed position causes the clamping element 40 to rotate clockwise about the pin 60 from the position in FIG. 9 to the position in FIG. 10 by means of the engagement between a portion 68 of the clamping element 40 and a portion 69 of the platform 28. Such rotation of the clamping element 40 changes the condition of the clamping device 39 from the closed condition in FIG. 9 to the fully open condition in FIG. 10.

The disc record 54 held between the clamping elements 40 and 41, and resting on the locating surfaces 31 of the platform 28 (FIG. 9), is transferred to the turntable 26 (FIG. 10) during the motion of the platform 28 from the elevated position (FIG. 9) to the depressed position (FIG. 10), when accompanied by a change in the condition of the clamping device 39 from the closed condition (FIG. 9) to the fully open condition (FIG. 10).

When the push button 35 (FIG. 3) is depressed after playback, a spring 63 (FIG. 11) causes the lid 21 to rise to the open position. When the lid 21 is opened, a spring 64 connected to a member 65 in engagement with the platform 28 (FIG. 12) causes the platform to rise with the lid from the depressed position (FIG. 10) to the elevated position (FIG. 9). Such motion of the platform 28 results in an anti-clockwise rotation of the clamping element 40 about the pin 60 from the position in FIG. 10 to the position in FIG. 9 due to the engaging surfaces 68 and 69 thereof. Such anti-clockwise rotation of the clamping element 41 changes the condition of the clamping device 39 from the fully open condition in FIG. 10 to the closed condition in FIG. 9.

The disc record 54 resting on the turntable 26 (FIG. 10) is transferred back to the platform 28 (FIG. 9) during the motion of the platform from the depressed position (FIG. 10) to the elevated position (FIG. 9), when accompanied by a change in the condition of the clamping device 39 from the fully open condition (FIG. 10) to the closed condition (FIG. 9).

As shown in FIG. 13, the platform 28 has a flared portion 66 in the vicinity of the input slot 22 which causes a peripheral portion of the video disc 54 resting on the platform to overhang. When an empty cover 44 is inserted into the player, the overhanging peripheral portion of the video disc 54 is automatically led into the cover. When the cover 44 is fully inserted in the player, (1) the video disc 54 is completely enclosed in the cover (FIG. 8), and (2) the front edge of the panel 45 bears against the block 57 (FIG. 8) so as to cause the push-on/push-off switch 58 to change its condition from the extended condition (FIG. 8) to the retracted condition (FIG. 7) via the connecting member 67 pivoted about the pin 60. The change in the condition of the push-on/push-off switch from the extended condition to the retracted condition causes the actuated member 59 to rotate about the pin 60 in an anti-clockwise direction from the position in FIG. 8 to the position in FIG. 7. Such rotation of the actuated member 59 causes the clamping element 41 to rotate in a clockwise direction about the pin 61 mounted on the clamping element 40 from the position in FIG. 8 to the position in FIG. 7. This rotation of the clamping element 41 changes the condition of the clamping device 39 from the closed condition (FIG. 8) to the partly open condition (FIG. 7). When the cover 44 is withdrawn, the clamping elements 40 and 41, while the clamping device 39 is in the partly open condition, allows the enclosed video disc 54 to be removed along with the cover.

It will be seen that the detents 52 and 53 engage the video disc 54 only upon its fully containment in the cover 44, so that a removal from the player of a video disc, while partially enclosed in its protective cover, is avoided.

Thus, it will be seen that the system allows a video disc to be inserted into and removed from a playback device while it remains enclosed in its protective cover.

The construction details of the afore-mentioned embodiment will now be explained. The clamping element 41 is pivoted for rotation about a pin 61 mounted on the clamping element 40. A pin 70 secured to the clamping element 41 is received in an arcuate slot 71 provided in the actuated member 59. The platform 28, the clamping element 40 and the actuated member 59 are mounted for rotation about the pin 60. The clamping element 40 is caused to rotate with the platform 28 due to the portion 68 of the clamping element 40 disposed in engagement with the portion 69 of the platform.

The block 57 is secured to one end of the connecting member 67 which, in turn, is fixedly mounted on the actuated member 59 pivoted about the pin 60. The other end of the actuated member 59 has a slot which receives a reduced portion disposed at one end of an actuating member 72 of the push-on/push-off switch 58. The push-on/push-off switch 58 alternates between a retracted condition (FIG. 7) and an extended condition (FIGS. 8–10) each time it is activated.

The foregoing is considered as illustrative only of the principles of the present invention. Further, since numerous modifications and changes will readily occur to those skilled in the art, it is not desired to limit the invention as to the exact construction and operation shown and described, and accordingly, all suitable modifications and equivalents may be resorted to provided they fall within the scope of the invention as claimed.

What is claimed is:

1. A player for recovering prerecorded signals from a disc record removably subject to occupancy of a protective cover comprising:
    (A) a housing having an input slot dimensioned to permit insertion of a protective cover into said player and removal therefrom;
    (B) a turntable rotatably mounted in said housing for supporting a disc record during playback;
    (C) clamping means mounted in said player for protruding into a protective cover during arrival of such a cover at a fully inserted position in said player;
    said clamping means being subject to operation in a first condition and a second condition;
    said clamping means, while disposed in said first condition, permitting arrival of an occupied cover at said fully inserted position;
    said clamping means, while disposed in said second condition, precluding arrival of an occupied cover at said fully inserted position;
    (D) means subject to engagement with a protective cover during arrival thereof at said fully inserted position in said player and responsive to each such engagement for alternating the condition of said clamping means between one of said conditions and the other of said conditions;
    said clamping means, while disposed in said second condition permitting a removal of a disc record from said cover during a cover withdrawal subsequent to an occupied cover arrival at said fully inserted position in said player; and
    (E) means for effecting a transfer of said removed disc record to said turntable in such manner that rotation of said removed record by said turntable may be effected thereafter with independence from said clamping means;
    said transfer effecting means including guide means, subject to motion between an elevated position and a depressed position, for supporting said removed disc record in said player during occupancy of said elevated position and for releasing said removed disc record during motion thereof from said elevated position to said depressed position.

2. A player as defined in claim 1 additionally including closure means secured to said housing for motion between a first position permitting an access to said input slot and a second position denying an access to said input slot; said player further including means responsive to motion of said closure means between said access permitting position and said access denying position for causing motion of said guide means between said elevated position and said depressed position respectively.

3. A player as defined in claim 1 wherein said clamping means is subject to operation in a third condition in addition to said operations in said first and second conditions; wherein said transfer effecting means additionally includes means, responsive to motion of said guide means to said depressed position, for changing the condition of said clamping means to said third condition, whereby a removed disc record resting on said guide means is transferred to said turntable for rotation therewith when motion of said guide means to said depressed position is accompanied by a change in the condition of said clamping means to said third condition; and wherein said condition changing means additionally serves, in response to motion of said guide means to said elevated position, to return said clamping means to the condition it occupied prior to said last change thereof to said third condition.

4. A system as defined in claim 3 wherein said clamping means includes a pair of elements; wherein one of said clamping elements is hingedly mounted on the other of said clamping elements; wherein said condition alternating means includes an actuating member which alternates between a first location and a second location in response to actuation thereof by a protective cover during its arrival at said fully inserted position in said player; wherein said condition alternating means further includes an actuated member interconnecting said hinged clamping element and said actuating member such that the motion of said actuating member between said first location and said second location causes said hinged clamping element to move respectively between an unclamped position and a clamped position.

5. A system as defined in claim 4 wherein said guide means is pivoted about an axis for rotation between said elevated position and said depressed position; wherein said actuated member is also pivoted for rotation about said rotation axis; wherein said connection between said actuated member and said hinged clamping element comprises a pin secured to said hinged clamping element subject to a reception in a slot provided in said actuated member.

6. A system as defined in claim 5 wherein said other clamping element is also pivoted for rotation about said rotation axis; wherein said condition changing means comprises a portion of said other clamping element disposed in engagement with a portion of said guide means for causing said other clamping element to rotate with said guide means between a raised location and a lowered location.

7. A player for recovering recorded signals from a disc record removably subject to occupancy of a protective cover comprising:
  (A) a housing having an input slot dimensioned to permit insertion of a protective cover into said player and removal therefrom;
  (B) a turntable rotatably mounted in said housing for supporting a record during playback;
  (C) guide means mounted in said housing subject to motion between an elevated position and a depressed position; said guide means being aligned with said input slot when said guide meas is occupying said elevated position;
  (D) clamping means mounted in said player for protruding into a protective cover during arrival thereof at a fully inserted position in said player; said clamping means being subject to operation in a first condition, a second condition and a third condition; said clamping means, while disposed in said first condition, permitting arrival of an occupied cover at said fully inserted position; said clamping means, while disposed in said second condition, precluding arrival of an occupied cover at said fully inserted position;
  (E) means subject to engagement with a protective cover during arrival thereof at said fully inserted position in said player and responsive to each such engagement for alternating the condition of said clamping means between said first condition and said second condition; said clamping means, while disposed in said second condition, precluding a removal of a record from said player during cover withdrawal subsequent to an occupied cover arrival at said fully inserted position in said player in such manner that a record is retained in said player resting on said guide means upon completion of said withdrawal;
  (F) means responsive to motion of said guide means to said depressed position for changing the condition of said clamping means to said third condition, whereby a retained record resting on said guide means is transferred to said turntable for rotation therewith free from interference from said clamping means when motion of said guide means to said depressed position is accompanied by disposition of said clamping means in said third condition.

8. A player for recovering recorded signals from a disc record removably subject to occupancy of a protective cover comprising:
  (A) a housing having an input slot dimensioned to permit insertion of a protective cover into said player and removal therefrom;
  (B) a turntable rotatably mounted in said housing for supporting a disc record during playback;
  (C) guide means mounted in said housing subject to motion between an elevated position and a depressed position; said guide means being aligned with said input slot when said guide means is occupying said elevated position;
  (D) clamping means mounted in said player for protruding into a protective cover between opposing main walls thereof during cover arrival at a fully inserted position in said player; said clamping means being subject to operation in a first condition and a second condition; said clamping means, while disposed in said first condition, permitting arrival of an occupied cover at said fully inserted position; said clamping means, while disposed in said second condition precluding arrival of an occupied cover at said fully inserted position;
  (E) means subject to engagement with a protective cover during arrival thereof at said fully inserted position in said player and responsive to each such engagement for alternating the condition of said clamping means between one of said conditions to the other of said conditions; said clamping means, while disposed in said second condition, engaging the outer periphery of an enclosed record during passage of an occupied cover to said fully inserted position in said player for precluding record removal from said player during a cover withdrawal subsequent to an occupied cover arrival at said fully inserted position, whereby said enclosed record is retained in said player resting on said guide means upon completion of said withdrawal; and
  (F) means responsive to motion of said guide means to said depressed position for effecting a transfer of said retained record resting on said guide means to said turntable in such manner that rotation of said retained record by said turntable may be effected thereafter independent of said clamping means.

* * * * *